United States Patent
Dutertre

(10) Patent No.: US 12,457,942 B2
(45) Date of Patent: Nov. 4, 2025

(54) ROUND BALER IMPLEMENT

(71) Applicant: Deere & Company, Moline, IL (US)

(72) Inventor: Matthieu Dutertre, Chemaudin (FR)

(73) Assignee: DEERE & COMPANY, Moline, IL (US)

( * ) Notice: Subject to any disclaimer, the term of this patent is extended or adjusted under 35 U.S.C. 154(b) by 351 days.

(21) Appl. No.: 18/333,059

(22) Filed: Jun. 12, 2023

(65) Prior Publication Data

US 2024/0023488 A1    Jan. 25, 2024

(30) Foreign Application Priority Data

Jul. 21, 2022  (DE) .......................... 102022118254.1

(51) Int. Cl.
*A01F 15/08* (2006.01)
*A01F 15/07* (2006.01)

(52) U.S. Cl.
CPC .... *A01F 15/0833* (2013.01); *A01F 2015/076* (2013.01)

(58) Field of Classification Search
CPC .................. A01F 15/0833; A01F 2015/076
See application file for complete search history.

(56) References Cited

U.S. PATENT DOCUMENTS

| | | | |
|---|---|---|---|
| 4,224,867 A | 9/1980 | Gaeddert et al. | |
| 5,315,925 A | 5/1994 | Viaud et al. | |
| 5,433,059 A * | 7/1995 | Kluver | A01F 15/0715 53/118 |
| 5,605,095 A * | 2/1997 | McClure | A01F 15/0833 100/88 |
| 5,687,548 A * | 11/1997 | McClure | A01F 15/0715 53/118 |
| H1819 H * | 12/1999 | Anderson | A01F 15/0833 56/341 |
| 7,913,482 B2 * | 3/2011 | Olander | A01F 15/0833 100/88 |
| 2008/0087177 A1 | 4/2008 | Olander et al. | |
| 2009/0049817 A1 | 2/2009 | Viaud | |
| 2014/0013970 A1 | 1/2014 | Olander | |
| 2017/0027107 A1 | 2/2017 | De Jong et al. | |

FOREIGN PATENT DOCUMENTS

| | | | |
|---|---|---|---|
| DE | 102011003727 A1 | 8/2012 | |
| EP | 3760032 A1 | 1/2021 | |

OTHER PUBLICATIONS

Extended European Search Report and Written Opinion issued in European Patent Application No. 23184795.5, dated Dec. 21, 2023, in 05 pages.

* cited by examiner

*Primary Examiner* — Matthew Katcoff

(57) ABSTRACT

A round baler implement having a variable pressing chamber for producing cylindrical round bales, includes at least one circulating pressing belt and at least one sensor device for detecting tension in the pressing belt. The sensor device includes a pivoting device and a pick-up that is received on the pivoting device so as to be preloaded in the direction of the pressing belt such that it is in contact with the pressing belt. The sensor device further includes a deflector which pivots the pivoting device upon contact with the pressing means independently of the tension of the pressing means to detect a misalignment of the pressing belt and/or an unevenly forming bale.

12 Claims, 4 Drawing Sheets

ROUND BALER IMPLEMENT

CROSS-REFERENCE TO RELATED APPLICATIONS

This application claims the benefit of German Patent Application No. 102022118254.1, filed on Jul. 21, 2022, the disclosure of which is hereby incorporated by reference.

TECHNICAL FIELD

The disclosure generally relates to a round baler implement, in particular an agricultural round baler implement for producing round bales having a cylindrical shape.

BACKGROUND

Round baler implements may include a variable pressing chamber for producing cylindrical round bales. The variable pressing chamber may include at least one circulating pressing means and at least one sensor device having a pivoting device, a pick-up which is received on the pivoting device so as to be preloaded in the direction of the pressing means such that it is in contact with the pressing means, and a sensor for determining the position of the pivoting device.

The round baler implement is used to pick up crop or baling material and to form this into cylindrical bales. Such round baler implements are frequently used in agriculture for retrieving straw or hay that has been deposited on the ground in swaths. The external shape of the round bale depends on the uniformity with which the baling material is fed. If baling material is fed non-uniformly, it is moreover possible for one-sided loading of the pressing means, which sets the round bale in rotation, to occur, such that, in addition to the movement component in the running direction of the pressing means, a component extending transversely thereto arises, possibly causing the pressing means to run obliquely. Such oblique running of the pressing means may cause the pressing means to tear or, if a plurality of pressing means are placed parallel to one another on the rollers, for these to cross one another. Damage to the pressing means may occur in particular when the pressing means, as a result of running obliquely, comes into contact with a side wall or a frame of the round baler implement.

The U.S. Pat. No. 4,224,867 discloses sensing the shape of the round bale by means of sensors which determine the tension of the pressing means, which may be in the form of a belt, and by means of a visual or acoustic display, providing an operator with a corresponding indication of the deformity of the round bale. The operator may, by changing the feed distribution, for example by adapting the mode of operation, feed more baling material to that side of the pressing chamber that lacks baling material. It is possible for such sensors not to function optimally if the pressing means runs obliquely.

SUMMARY

The disclosure provide a round baler implement having at least one circulating pressing means and at least one sensor device which in turn has a pivoting device, a pick-up and a sensor. The pick-up is received on the pivoting device so as to be preloaded in the direction of the pressing means such that it is in contact with the pressing means, in order to pivot the pivoting device depending on a tension of the pressing means. The sensor serves to determine the position of the pivoting device. The information provided by the sensor may allow conclusions to be drawn about the shape of the bale formed, such that, for example, an operator and/or a control unit can influence the supply of material or the feed of the round baler implement. The sensor device furthermore has a deflector which pivots the pivoting device upon contact with the pressing means independently of the tension of the pressing means. In this way, the deflector can pivot the pivoting device when or as soon as the pressing means no longer circulates optimally, shifts for example obliquely, in particular in the direction of a side wall of the round baler implement. The sensor then provides corresponding information such that the operator and/or the control unit can influence the operation of the round baler implement.

In one aspect of the disclosure, the round baler implement is an agricultural round baler implement for producing cylindrical bales of a crop material within a field. However, it is also conceivable for it to be embodied as an industrial round baler implement, for example a baler for producing bales of paper, textiles, waste or other materials.

In one aspect of the disclosure, the pivoting device may be pivoted by the deflector differently than the pick-up, preferably more intensely, and/or the sensor, in the event of pivoting by the deflector, provides information different than the information brought about by the pick-up, such that it is apparent to the operator or the control unit that there is a situation other than the normal operating situation, in particular in the sense of oblique running of the pressing means.

On one aspect of the disclosure, the deflector may be provided in a manner at least substantially adjoining the pick-up on the pivoting device. Such a configuration may favor a compact structure of the sensor device.

In one aspect of the disclosure, the round baler implement has at least one side wall and the sensor device is provided in a manner adjoining the side wall. The sensor device may supply corresponding information when the pressing means shifts its path in the direction of the side wall. Alternatively or addition to, the deflector may be provided on a side of the pick-up that faces the side wall, such that it passes into contact with the pressing means when the pressing means shifts in the direction of the side wall.

In one aspect of the disclosure, it is conceivable for the pick-up to be rigid. However, improved function arises when it has at least one, in particular rotatable roller. Such a roller may bear on the pressing means and preferably rotate at least partially therewith. This can result in improved guidance and/or the friction and thus the wearing of the pressing means and/or pick-up can be reduced.

In one aspect of the disclosure, the sensor structure is particularly simple when the pick-up and the deflector are connected, preferably fixedly, to a common pivot shaft.

In one aspect of the disclosure, the sensor device may include a mount. Via the mount, the sensor device may be attached, for example, to a frame of the baler implement. The pivoting device may be provided on the mount so as to be pivotable. For example, provision may be made for the pivot shaft to be received rotatably in a bearing device provided on the mount.

In one aspect of the disclosure, the sensor may be in the form of a potentiometer. For example, the sensor may pick up pivoting movement of the pivoting device with regard to the round baler implement and/or the mount.

In one aspect of the disclosure, the preloading of the pivoting device may be achieved in a simple manner by means of a spring element, wherein the spring element acts on the pivoting device preferably with a first end, preferably via a pivot arm, and acts on the mount with a second end. In one implementation, the spring element may be of the tension spring type.

It is conceivable for the round baler implement to be equipped with only one sensor device. However, it is particularly favorable when the round baler implement has two sensor devices which are each arranged so as to adjoin a respective side wall of the round baler implement. The pressing means may be embodied in one piece, wherein the sensor devices may be provided such that they cooperate with respective peripheral regions of the pressing means. However, in other implementations, the pressing means has two pressing belts, wherein in each case one of the sensor devices cooperates with one of the pressing belts.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
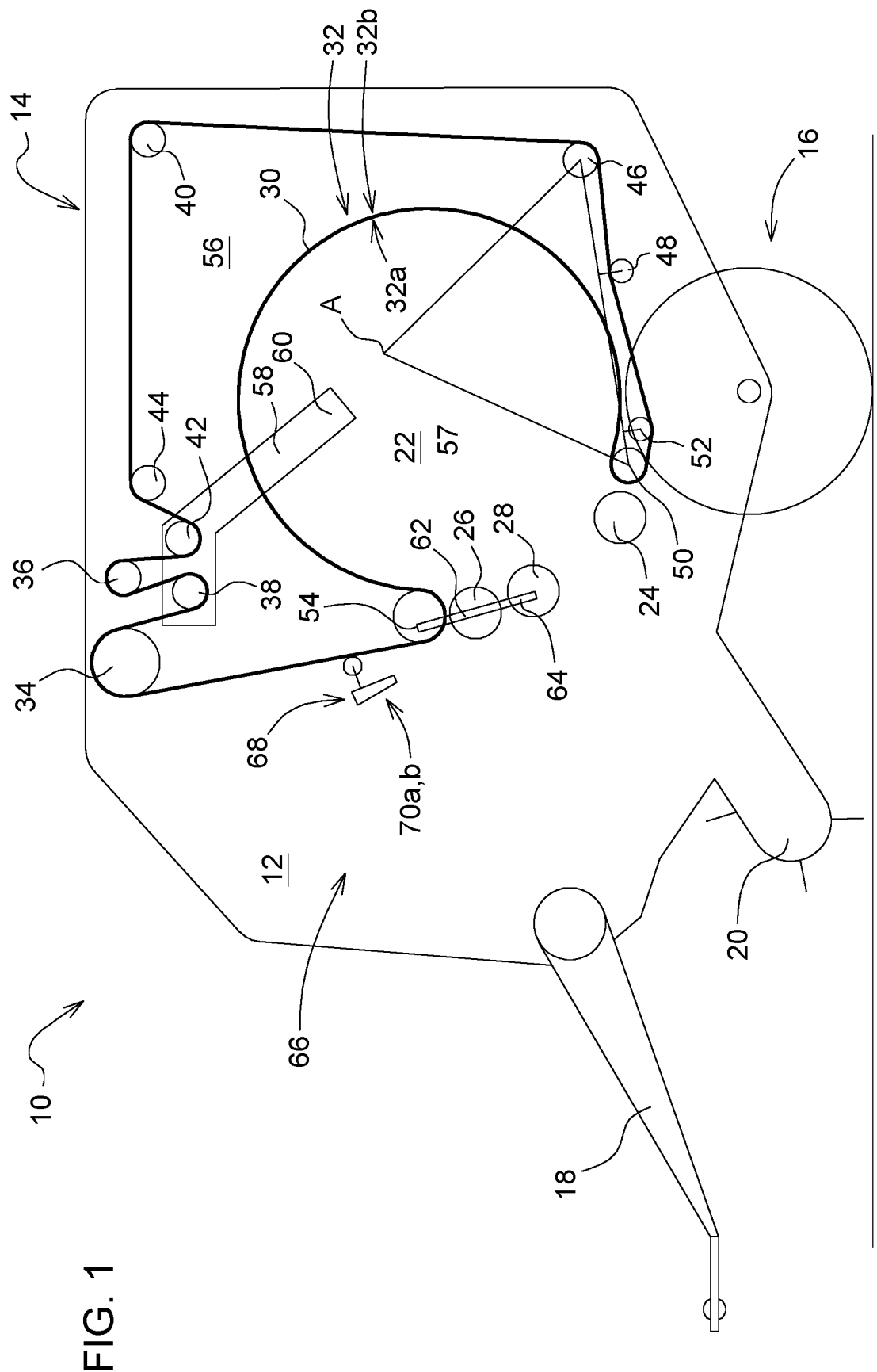
FIG. 1 is a schematic side view of a round baler implement having a plurality of rolls arranged in a housing, a pressing means wrapping around the rolls, and a sensor apparatus having two sensor devices.

Referring to the Figures, wherein like numerals indicate like parts throughout the several views, a round baler implement is generally shown at 10 in FIG. 1. Referring to FIG. 1, the round baler implement 10 includes a housing 12 and a frame 14 that is supported on a chassis 16. Arranged on the front side of the frame 14 is a drawbar 18 in order to hitch the round baler implement 10 to a tractor and to be able to pull it over a field. A receiving apparatus 20 in the form of a pick-up serves to pick up crop lying on the ground, for example hay or straw deposited in a swath. The crop picked up by the receiving apparatus 20 is fed to the inlet 22 of a baling chamber 23 and rolled up spirally therein to form a round-cylindrical bale, tied and subsequently deposited on the ground. Positioned at the inlet 22 of the baling chamber 23 are a lower, stationary roller 24 and two upper rollers 26, 28. The baling chamber 23 is also formed by an endless pressing means 30 in the form of two pressing belts 32 that laterally adjoin one another immediately alongside one another, are guided around a number of rolls 34-54 and have a respective inner side 32a facing the bale to be formed and a respective outer side 32b disposed opposite thereof. While the baling chamber 22 is circumferentially surrounded substantially by the pressing means 30 and the rollers 24 to 28, it is delimited laterally by side walls 56.

Four of the rollers 46 to 52 are mounted so as to be freely rotatable at the lower end of a delta-shaped carrier 57, which is hinged so as to be pivotable by way of its upper tip about an axis of rotation A. The carrier 57 is arranged horizontally and transversely relative to the forward direction and is able to be moved by means of an actuator (not shown) from the bale forming position illustrated in FIG. 1 into a rearwardly and upwardly pivoted bale ejection position.

A tensioning mechanism for tautening the pressing means 30 comprises a tensioning arm 58, two rolls 38, 42 arranged movably at the radially outer end region of the tensioning arm, and a tensioning element that is not shown. The tensioning arm 58 is mounted in a bearing 60 so as to be pivotable, in the region of the side walls 38 and above and in front of the axis of rotation A, about an axis extending horizontally and transversely to the forward direction, and extends until it is under the plane in which the positionally fixed upper rolls 34, 36, 44 are arranged. The tensioning element is conventionally in the form of a mechanical spring or of a hydraulic motor.

The upper rollers 26, 28 and the roll 54 are fastened to a pivotable pivoting frame 64, which is mounted in its central region about a shaft 62 extending horizontally and transversely to the forward direction. The roll 54 and the rollers 26, 28 are mounted so as to be freely rotatable in the pivoting frame 64, wherein the roller 26 extends coaxially with the shaft 62. The pivoting frame 64 may be preloaded into a particular position by means of a tensioning element that is not shown.

The pressing means 30 is placed firmly against the rotationally driven, positionally fixed roll 34 by means of the tensioning arm 58 so as to ensure that it is entrained. The roll 54 is also driven in rotation. The pressing means 30 adopts a starting state in which, in a stretched-out state, it bridges the inlet 22, and a final state in which it wraps in the manner of a large loop around the bale 36, approximately as shown in FIG. 1. The baling chamber 12 thus has a variable size, i.e. its diameter increases with the size of the bale. While it is being formed, the bale is located in the baling chamber 12 and is largely wrapped around by the pressing means 30, but drops rearwardly out of the baling chamber 12 onto the ground as soon as the carrier 57 with the movable rolls 46 to 52 pivots upward in a counterclockwise direction as seen in the drawing.

Provided in a region 66 of the baling chamber 23 facing the drawbar 18 is a sensor apparatus 68 for determining a tension in the pressing means 30. The sensor apparatus 68 has respective sensor devices 70 adjoining a first and, respectively, a second side wall 56 of the housing. The sensor devices 70 are substantially identical, although mirror-inverted, wherein only one of the sensor devices 70 is described in more detail in the following text.

Figure 2:
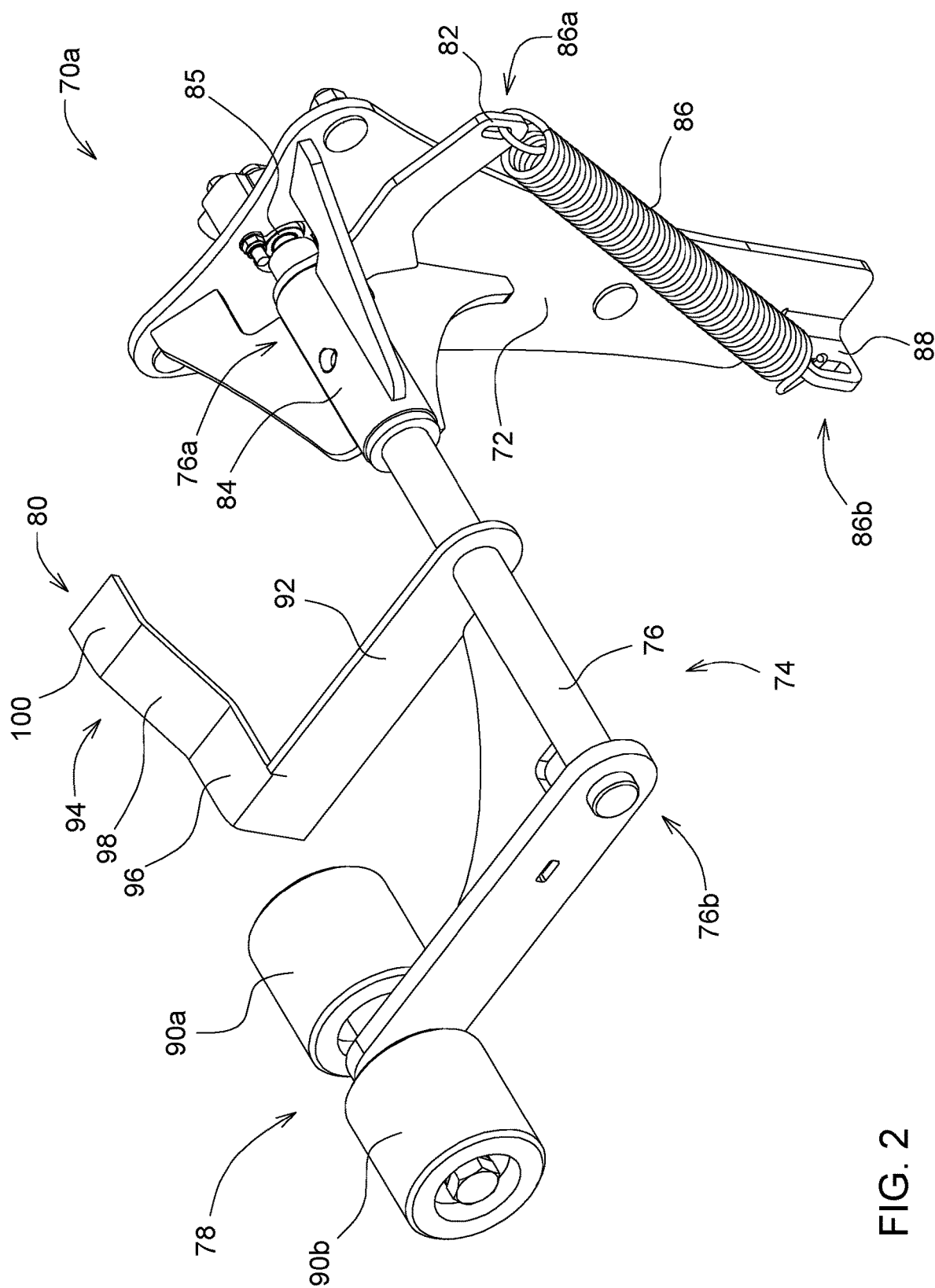
FIG. 2 is a perspective view of one of the sensor devices.

Reference is now made to FIG. 2, in which the sensor device 70 that is arranged on the left as seen from the direction of the drawbar 18 is illustrated in more detail. The sensor device 70 has a mount 72, via which the sensor device 70 is attached in a known way to the frame 14 of the round baler implement 10, and a pivoting device 74. The pivoting device 74 comprises a pivot shaft 76, a pick-up 78, a deflector 80 and a pivot arm 82. The mount 72 in turn has a bearing device 84 which is connected rigidly to it and in which the pivot shaft 76 is rotatably received, said pivot shaft 76 extending substantially horizontally in the direction of the baling chamber 23 from the mount 72.

The pivot shaft 76 has a first end region 76a, which adjoins the mount 72, and a second end region 76b opposite the first end region 76a. Provided on the mount 72 is a sensor 85, which cooperates with the first end region 76a of the pivot shaft 76 such that it can determine a degree of pivoting between the pivoting device 74 or the pivot shaft 76 and the mount 72. Preferably, the sensor 85 is of the potentiometer type, which cooperates with a control unit (not shown) of the round baler implement 10 and provides the latter and/or an operator with information about the degree of pivoting of the pivot shaft 76.

The pivot arm 82 is fixedly connected to the pivot shaft 76 in a manner adjoining the first end region 76a and the pick-up 78 is fixedly connected to said pivot shaft 76 in a manner adjoining the second end region 76b. The pick-up 80 in turn is provided between the two end regions 76a, 76b and likewise connected to the pivot shaft 76 for conjoint rotation. The pivot arm 82 is arranged in a manner offset at least approximately through 180° with respect to the pick-up 78 or the deflector 80.

A spring element 86 acts on the pivot arm 82 with a first end 86a. A second end 86b of the spring element 86 is connected to a shoulder 88 of the mount 72, projecting away from the latter in the direction of the baling chamber 23, such that it preloads the pivot shaft 76 and thus the deflector 80 and the pick-up 78 in the direction of the pressing means 30. The spring element 86 is, to this end, preferably embodied as a tension spring, but may also be of another suitable type.

Received rotatably on the pick-up 78, in a region away from the pivot shaft 76, are two rollers 90 which, in a substantially normal operating situation, bear on the pressing means 32 or on the outer side 32b of one of the pressing belts 32, in order to cooperate therewith.

The deflector 80 has a carrier 92 extending away from the pivot shaft 76 substantially parallel to the pick-up 78. Firmly attached to the carrier 92 is a doubly angled holder 94 which extends from the carrier 92 in the direction of the mount 72. The holder 94 is angled such that it has, adjoining the carrier 92, a face 96 which is aligned substantially with a top side of the rollers 90. This face 96 is adjoined by an upwardly rising contact face 98 which ends in an end region 100 that is angled downwardly in the direction of the mount 72 and extends at least substantially parallel to the face 96.

The manner of operation of the sensor devices 70 will be discussed in more detail in the following text. In this regard, reference is now made to FIGS. 3A, 3B and 4A, 4B, in which again only one of the sensor device 70 is illustrated. The manner of operation of the second sensor device not shown in detail in FIGS. 3A-4B corresponds to the manner of operation of the first sensor device 70 shown in FIGS. 3A-4B and described in greater detail below.

Figure 3A:
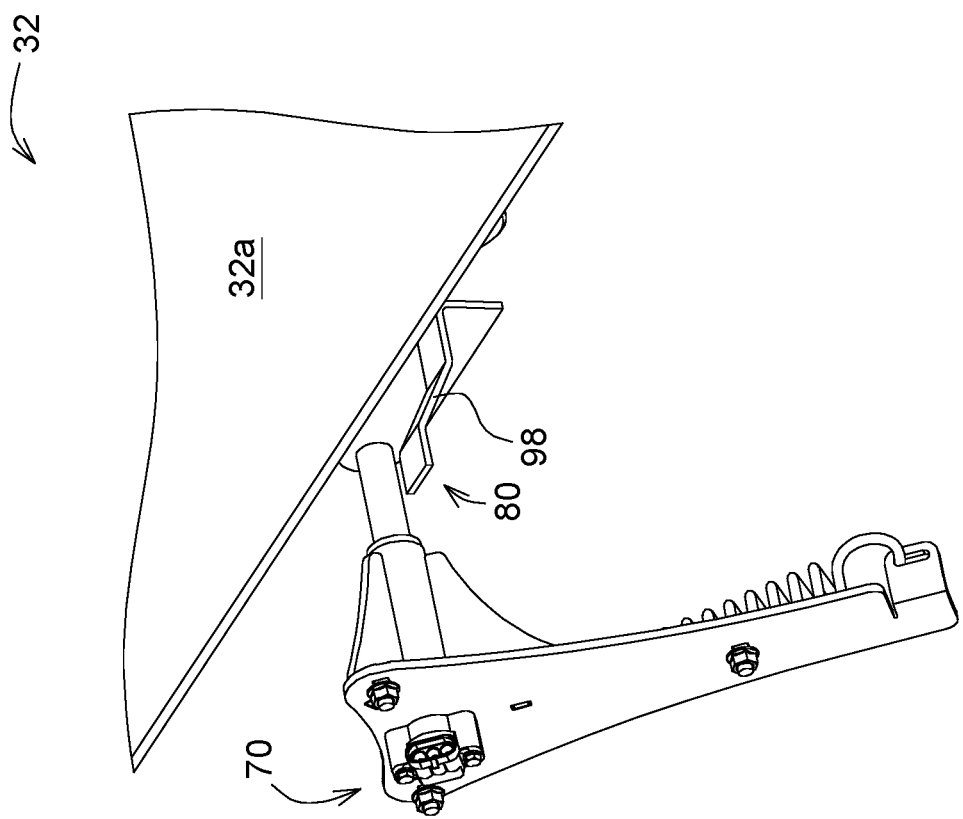
FIG. 3A is a schematic perspective view from above of the sensor device in a first position.
Figure 3B:
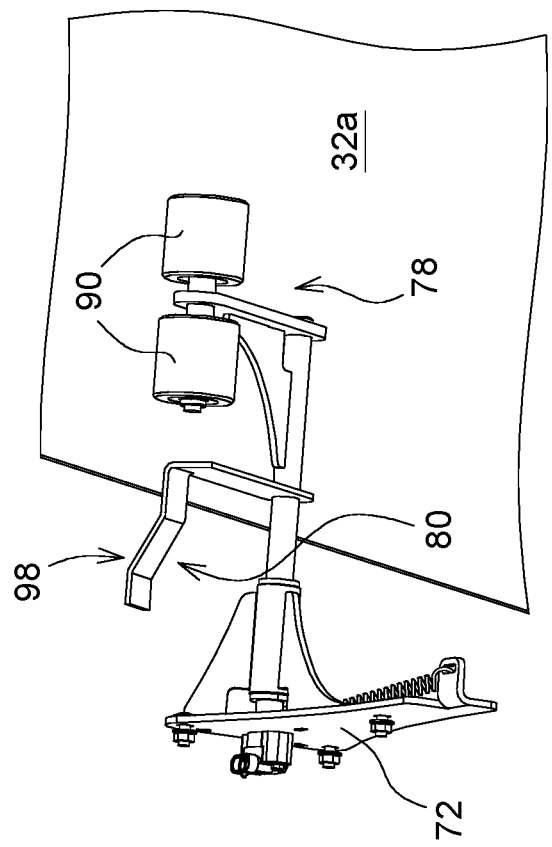
FIG. 3B is a schematic perspective view from below of the sensor device in the first position.

FIGS. 3A, 3B each show one of the sensor devices 70 in an operating situation of the round baler implement 10, in which the pressing means or the pressing belt 32 cooperating with the respective sensor device 70 extends as straight as possible and parallel to a longitudinal axis (not shown) of the round baler implement 10. The pick-up of the sensor device 70 bears on the pressing belt 32 or on its outer side 32b and pivots the pivot shaft 76 depending on the tension of the pressing belt 32. If the tension is relatively high, the pivot shaft 76 pivots more than in the case of a relatively low tension. This pivoting is picked up by the sensor 85 between the mount 72 and the pivot shaft 76. The sensor 85 sends information or values representative of the state of tension to the control unit. The opposite sensor device 70 also determines correspondingly values for the opposite region of the pressing means 30 or the second pressing belt 32. In such an operating situation, the pressing means 30 or the pressing belt 32 does not act on the deflector 80.

On the basis of the determined information or on the basis of differences in the values, conclusions can be drawn by the control unit about the shape of the bale. Thus, increased tension in one of the pressing belts 32 indicates that the bale is larger in the region of this pressing belt 32 than in the region of the second pressing belt 32 and/or is exceeding a maximum value. The control unit or an operator can then accordingly adapt for example the supply of material/feed on the basis of the determined values. This can take place for example such that the round baler implement 10 or a tractor (not shown) changes track, e.g., weaving left and/or right, in order to accordingly adapt for example the picking up of a swath of crop.

However, it is also possible for the pressing means 30 or in particular one of the pressing belts 32, in particular on account of a non-uniform feed and resultant transverse forces, no longer to extend parallel to the longitudinal axis, and to extend obliquely and to shift for example in the direction of the corresponding side wall 56 of the round baler implement 10. In this situation, it may be the case that contact between the pressing belt 32 and the pick-up 76 is partially or entirely broken and/or, via the sensor 85, misleading values/values not adapted to the operating situation are picked up or such information is supplied. According to the illustration in FIGS. 4A, 4B, the pressing belt 32 then passes into contact with the deflector 80. In particular, the pressing belt 32 acts on the contact face 98 of the deflector 80. The further the pressing belt 32 shifts in the direction of the side wall 56, the greater the influence that the pressing belt 32 has on the contact face 98 and the greater the deflector 80 and thus the pivot shaft 76 is pivoted.

Figure 4A:
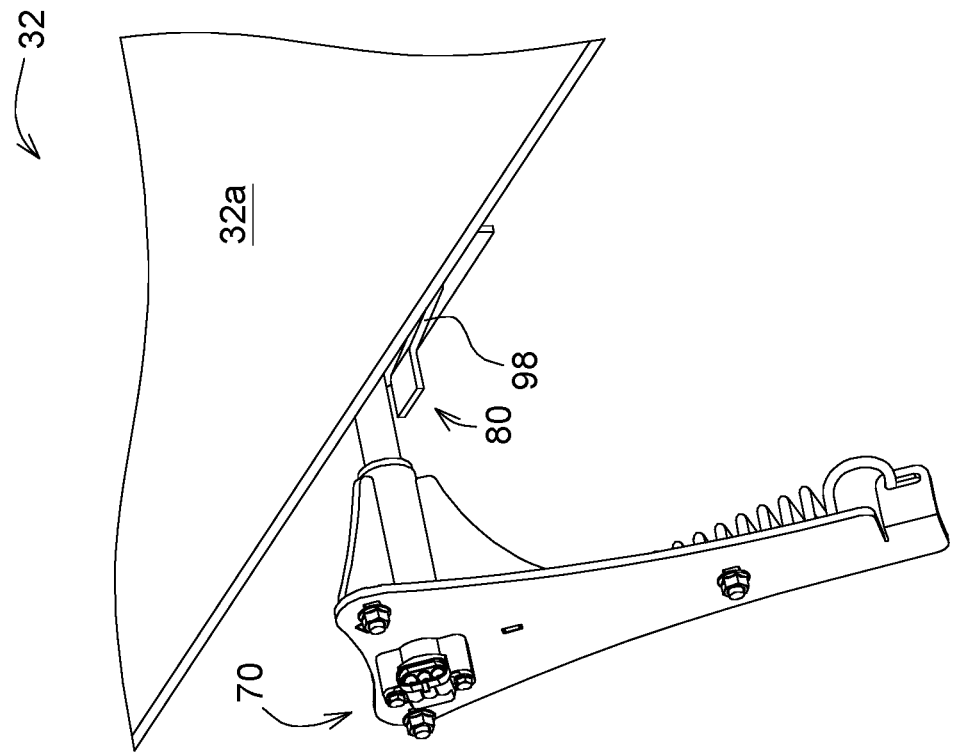
FIG. 4A is a schematic perspective view from above of the sensor device in a second position.
Figure 4B:
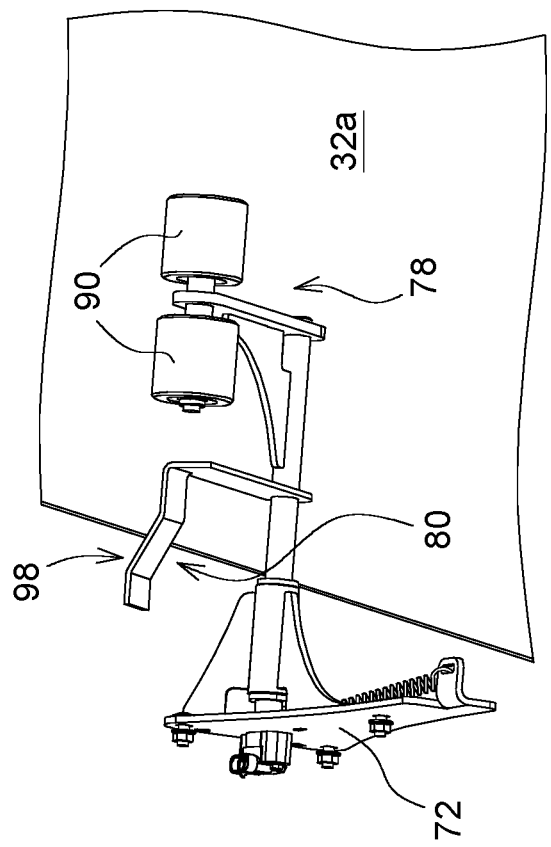
FIG. 4B is a schematic perspective view from below of the sensor device in the second position.

In such an operating situation, shown in FIGS. 4A, 4B, the pivot shaft 76 now pivots, on account of the contact of the pressing belt 32 with the deflector 80, independently of the pick-up 78, which would possibly provide incorrect and/or misleading information on account of the oblique or non-optimal course of the pressing belt 32 without the action of the deflector 80. As a result of the rising formation of the contact face 98, the pivot shaft 62 pivots particularly intensely, such that the values supplied by the sensor 85 considerably exceed the values supplied in a "normal" operating situation. These values are provided to the operator and/or the control unit such that the operation of the round baler implement 85 can be influenced manually and/or automatically.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A round baler implement comprising:
   a variable pressing chamber for producing cylindrical round bales;
   at least one circulating pressing belt;
   at least one sensor assembly having a pivoting device, a pick-up attached to the pivoting device and preloaded in a direction of the pressing belt into contact with the pressing belt, and a sensor operable to detect a position of the pivoting device indicating a tension of the pressing belt against the pick-up;
   wherein the sensor assembly includes a deflector coupled to the pivoting device and operable to pivot the pivoting device upon contact with the pressing belt independently of tension of the pressing belt against the pick-up.

2. The round baler implement set forth in claim 1, wherein the pivoting device is pivoted by the deflector in a manner that is different than when the pivoting device is pivoted by the pick-up, whereby the sensor assembly provides information when the pivoting device is pivoted by the deflector that is different than information when the pivoting device is pivoted by the pick-up.

3. The round baler implement set forth in claim 1, wherein the deflector is at least substantially adjoining the pick-up on the pivoting device.

4. The round baler implement set forth in claim 1, further comprising at least one side wall, wherein the sensor assembly is positioned adjacent to the side wall and the deflector is provided on a side of the pick-up that faces the side wall.

5. The round baler implement set forth in claim 1, wherein the pick-up has at least one roller.

6. The round baler implement set forth in claim 1, wherein the pick-up and the deflector are connected to a common pivot shaft.

7. The round baler implement set forth in claim 1, wherein the sensor assembly has a mount and the pivoting device is provided on the mount so as to be pivotable thereto.

8. The round baler implement set forth in claim 1, wherein the sensor includes a potentiometer operable to detect pivotal movement of the pivoting device.

9. The round baler implement set forth in claim 1, wherein the pivoting device is preloaded by a spring element.

10. The round baler implement set forth in claim 9, wherein the spring element includes a first end engaging the pivoting device via a pivot arm, and includes a second end engaging a mount of the sensor assembly.

11. The round baler implement set forth claim 1, wherein the at least one sensor assembly includes two sensor assemblies, with each respective sensor assembly arranged to adjoin a respective side wall of the baling chamber.

12. The round baler implement set forth in claim 11, wherein the pressing belt includes two pressing belts, with each respective one of the pressing belts arranged adjacent a respective side wall and a respective one of the two sensor assemblies.

* * * * *